(12) United States Patent
Kohatsu et al.

(10) Patent No.: US 11,426,962 B2
(45) Date of Patent: Aug. 30, 2022

(54) METHOD OF APPLYING OUTSOLE TO AN ARTICLE OF FOOTWEAR

(71) Applicant: NIKE, Inc., Beaverton, OR (US)

(72) Inventors: Shane S. Kohatsu, Portland, OR (US); Jill D. Murfin, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 210 days.

(21) Appl. No.: 16/857,572

(22) Filed: Apr. 24, 2020

(65) Prior Publication Data

US 2020/0338847 A1 Oct. 29, 2020

Related U.S. Application Data

(60) Provisional application No. 62/839,448, filed on Apr. 26, 2019.

(51) Int. Cl.
| | |
|---|---|
| *B29D 35/12* | (2010.01) |
| *B29D 35/14* | (2010.01) |
| *A43B 13/12* | (2006.01) |
| *A43B 13/04* | (2006.01) |
| *B29K 75/00* | (2006.01) |
| *A43B 13/18* | (2006.01) |

(52) U.S. Cl.
CPC ............ *B29D 35/122* (2013.01); *A43B 13/04* (2013.01); *A43B 13/12* (2013.01); *A43B 13/187* (2013.01); *B29K 2075/00* (2013.01)

(58) Field of Classification Search
CPC .......................... B29D 35/142; B29D 35/122
See application file for complete search history.

(56) References Cited

U.S. PATENT DOCUMENTS

| | | | |
|---|---|---|---|
| 4,418,483 A | 12/1983 | Fujita et al. | |
| 6,749,781 B1 * | 6/2004 | Maurer | B29C 39/025 264/250 |
| 2004/0000255 A1 * | 1/2004 | Hernandez | B29D 35/142 106/38 |
| 2005/0217148 A1 | 10/2005 | Connolly et al. | |
| 2008/0193774 A1 | 8/2008 | Stone et al. | |
| 2013/0126075 A1 | 5/2013 | Jiang | |

(Continued)

FOREIGN PATENT DOCUMENTS

| | | |
|---|---|---|
| DE | 2851390 A1 | 6/1980 |
| EP | 3078290 A1 | 10/2016 |

(Continued)

OTHER PUBLICATIONS

Partial machine translation of Chan, JP 2002-085105 A dated Mar. 26, 2002 obtained from the espace website. (Year: 2002).*

(Continued)

*Primary Examiner* — Robert B Davis
(74) *Attorney, Agent, or Firm* — Honigman LLP; Matthew H. Szalach; Jonathan O'Brien (57) ABSTRACT

A method of forming a sole structure for an article of footwear. The method includes providing a midsole element formed of a first polymeric material. The method also includes depositing an outsole material including an uncured second polymeric material upon an exterior surface of the midsole element and molding the midsole element and the outsole material to impart an outsole profile to the outsole material and curing the outsole material on the exterior surface of the midsole element.

20 Claims, 9 Drawing Sheets

(56) References Cited

U.S. PATENT DOCUMENTS

2015/0096195 A1    4/2015   Bacon et al.
2015/0366289 A1   12/2015   Rustam et al.

FOREIGN PATENT DOCUMENTS

GB           2076725 A      12/1981
JP       2002085105 A   *   3/2002

OTHER PUBLICATIONS

Partial machine translation of Linnemann, DE 2851390 A1 dated Jun. 4, 1980 obtained from the espace website. (Year: 1980).*
European Patent Office (ISA), International Search Report and Written Opinion for PCT Application No. PCT/US2020/029757, dated Jul. 23, 2020.
European Patent Office (ISA), International Search Report and Written Opinion for PCT Application No. PCT/US2020/029743, dated Jul. 10, 2020.

* cited by examiner

METHOD OF APPLYING OUTSOLE TO AN ARTICLE OF FOOTWEAR

CROSS REFERENCE TO RELATED APPLICATIONS

This non-provisional U.S. Patent Application claims priority under 35 U.S.C. § 119(e) to U.S. Provisional Patent Application Ser. No. 62/839,448, filed Apr. 26, 2019, the disclosure of which is hereby incorporated by reference in its entirety.

FIELD

The present disclosure relates generally to sole structures for articles of footwear and more particularly to methods of applying outsoles to sole structures.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be at least partially formed of rubber or other materials that impart durability and wear-resistance, as well as enhance traction with the ground surface. Another layer of the sole structure includes a midsole disposed between the outsole and the upper. The midsole provides cushioning for the foot and may be partially formed from a polymer foam material that compresses resiliently under an applied load to cushion the foot by attenuating ground-reaction forces. The midsole may additionally or alternatively incorporate a fluid-filled bladder to increase durability of the sole structure, as well as to provide cushioning to the foot by compressing resiliently under an applied load to attenuate ground-reaction forces. Sole structures may also include a comfort-enhancing insole or a sockliner located within a void proximate to the bottom portion of the upper and a strobel attached to the upper and disposed between the midsole and the insole or sockliner.

DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a method of forming a sole structure for an article of footwear. The method includes (i) providing a midsole element formed of a first polymeric material and (ii) depositing an outsole material including an uncured second polymeric material upon an exterior surface of the midsole element. The method also includes molding the midsole element and the outsole material to impart an outsole profile to the outsole material and curing the outsole material on the exterior surface of the midsole element.

Implementations of the disclosure may include one or more of the following optional features. In some implementations, the first polymeric material may be a foamed material.

In some examples, the second polymeric material may be a polyurethane. Optionally, the second polymeric material may be polyurea. The midsole element may be a finished midsole.

In some configurations, the molding step includes a cold pressing process. The midsole element may be a midsole preform.

In some implementations, the molding step includes a compression molding process. The method may also include partially curing the second polymeric material prior to molding the midsole element and the outsole material. Further, the outsole material may include a particulate additive. The method may include masking the exterior surface of the midsole element.

Another aspect of the disclosure provides a method of forming a sole structure for an article of footwear. The method includes providing a midsole element formed of a foamed polymeric material. The method also includes (i) depositing an outsole material including an uncured polyurethane material upon an exterior surface of the midsole element, (ii) molding the midsole element and the outsole material to impart an outsole profile to the outsole material, and (iii) curing the outsole material on the exterior surface of the midsole element.

Implementations of the disclosure may include one or more of the following optional features. In some implementations, the uncured polyurethane material may be polyurea.

In some implementations, the midsole element may be a finished midsole. Additionally or alternatively, the molding step may include a cold pressing process.

In some configurations, the midsole element may be a midsole preform.

The molding step may include a compression molding process.

In another example, the method may include partially curing the polyurethane material prior to molding the midsole element and the outsole material. The outsole material may include a particulate additive.

In some configurations, the method includes masking the exterior surface of the midsole element.

Figure 1:
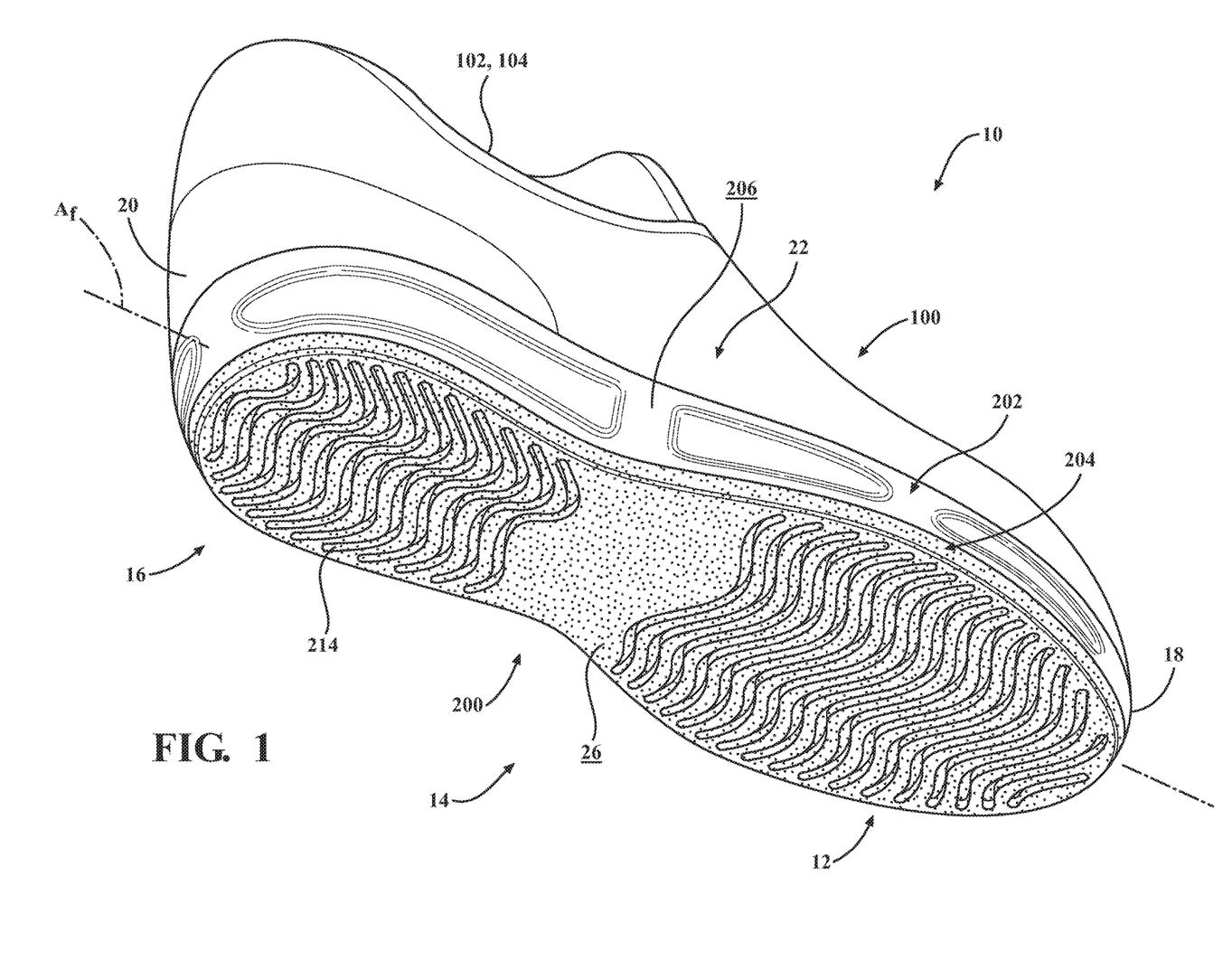
FIG. 1 is a perspective view of an article of footwear formed according to the principles of the present disclosure.

Referring to FIG. 1, an article of footwear 10 includes an upper 100 and sole structure 200. The article of footwear 10 may be divided into one or more regions. The regions may include a forefoot region 12, a mid-foot region 14, and a heel region 16. The forefoot region 12 corresponds with phalanges and metatarsal bones of a foot. The mid-foot region 14 may correspond with an arch area of the foot, and the heel region 16 may correspond with rear portions of the foot, including a calcaneus bone. The footwear 10 may further include an anterior end 18 associated with a forward-most point of the forefoot region 12, and a posterior end 20 corresponding to a rearward-most point of the heel region 16. A longitudinal axis $A_F$ of the footwear 10 extends along a length of the footwear 10 from the anterior end 18 to the posterior end 20, and generally divides the footwear 10 into a lateral side 22 and a medial side 24. Accordingly, the lateral side 22 and the medial side 24 respectively correspond with opposite sides of the footwear 10 and extend through the regions 12, 14, 16.

The upper 100 includes interior surfaces that define an interior void 102 configured to receive and secure a foot for support on sole structure 200. The upper 100 may be formed from one or more materials that are stitched or adhesively bonded together to form the interior void 102. Suitable materials of the upper may include, but are not limited to, mesh, textiles, foam, leather, and synthetic leather. The materials may be selected and located to impart properties of durability, air-permeability, wear-resistance, flexibility, and comfort.

In some examples, the upper 100 includes a strobel having a bottom surface opposing the sole structure 200 and an opposing top surface defining a footbed of the interior void 102. Stitching or adhesives may secure the strobel to the upper 100. The footbed may be contoured to conform to a profile of the bottom surface (e.g., plantar) of the foot. Optionally, the upper 100 may also incorporate additional layers such as an insole or sockliner that may be disposed upon the strobel and reside within the interior void 102 of the upper 100 to receive a plantar surface of the foot to enhance the comfort of the article of footwear 10. An ankle opening 104 in the heel region 16 may provide access to the interior void 102. For example, the ankle opening 104 may receive a foot to secure the foot within the void 102 and facilitate entry and removal of the foot from and to the interior void 102.

In some examples, one or more fasteners may extend along the upper 100 to adjust a fit of the interior void 102 around the foot and to accommodate entry and removal of the foot therefrom. The fasteners may include laces, straps, cords, hook-and-loop, or any other suitable type of fastener. The upper 100 may include a tongue portion that extends between the interior void 102 and the fasteners. While the upper 100 of the present disclosure is illustrated as an enclosed upper for a shoe, the principles of the present disclosure may be applied to other types of footwear having alternative styles of uppers, such as sandals and boots, for example.

With continued reference to FIG. 1, the sole structure 200 includes a midsole 202 configured to provide cushioning characteristics to the sole structure 200, and an outsole 204 configured to provide a ground-engaging surface 26 of the article of footwear 10. Unlike conventional sole structures where the outsole comprises one or more pre-formed polymeric layers that are mechanically or adhesively attached to the midsole 202, the outsole 204 of the present disclosure is applied in a multi-step process, wherein an outsole material 204a is initially applied to a midsole element 202a, 202b in an aqueous or fluid state and then molded and cured to provide a type of resilient skin coating over an exterior surface 206 of the midsole 202.

The midsole 202 may be formed of one or more components selected to impart properties of cushioning and stability. In the illustrated example, the midsole 202 includes a unitary foam structure extending continuously from the anterior end 18 to the posterior end 20 of the article of footwear 10. However, in other examples the midsole 202 may be a composite structure having a plurality of foam support elements and/or fluid-filled bladders cooperating to form the midsole 202.

The exterior surface 206 of the midsole 202 may be described as including a top surface 208 configured to face the strobel of the upper 100 and defining a profile of the footbed of the interior void 102. A bottom surface 210 of the midsole 202 is formed on an opposite side from the top surface 208. A peripheral side surface 212 of the midsole extends from the top surface 208 to the bottom surface 210 and forms an outer peripheral profile of the sole structure 200. While the present disclosure shows the outsole material 204a being applied on the bottom surface 210 of the midsole 202, in other examples the outsole material 204a may be deposited at least partially onto the peripheral side surface 212 of the midsole 202, such that outsole 204 extends over the midsole 202 when cured.

As described above, the midsole 202 includes a resilient polymeric material, such as foam or rubber, to impart properties of cushioning, responsiveness, and energy distribution to the foot of the wearer. In the illustrated example, the midsole 202 includes a single element formed of a single foam material. However, in other examples, the midsole 202 may include a plurality of foam elements and/or may be formed of a plurality of foam materials to impart different performance properties to regions of the sole structure 200. For example, a first foam element may be formed of foam materials providing greater cushioning and impact distribution, while other foam elements are formed of foam materials having a greater hardness in order to provide increased lateral stiffness.

Example resilient polymeric materials for the midsole 202 may include those based on foaming or molding one or more polymers, such as one or more elastomers (e.g., thermoplastic elastomers (TPE)). The one or more polymers may include aliphatic polymers, aromatic polymers, or mixtures of both; and may include homopolymers, copolymers (including terpolymers), or mixtures of both.

In some aspects, the one or more polymers may include olefinic homopolymers, olefinic copolymers, or blends thereof. Examples of olefinic polymers include polyethylene, polypropylene, and combinations thereof. In other aspects, the one or more polymers may include one or more ethylene copolymers, such as, ethylene-vinyl acetate (EVA) copolymers, EVOH copolymers, ethylene-ethyl acrylate copolymers, ethylene-unsaturated mono-fatty acid copolymers, and combinations thereof.

In further aspects, the one or more polymers may include one or more polyacrylates, such as polyacrylic acid, esters of polyacrylic acid, polyacrylonitrile, polyacrylic acetate, polymethyl acrylate, polyethyl acrylate, polybutyl acrylate, polymethyl methacrylate, and polyvinyl acetate; including derivatives thereof, copolymers thereof, and any combinations thereof.

In yet further aspects, the one or more polymers may include one or more ionomeric polymers. In these aspects, the ionomeric polymers may include polymers with carboxylic acid functional groups, sulfonic acid functional groups, salts thereof (e.g., sodium, magnesium, potassium, etc.), and/or anhydrides thereof. For instance, the ionomeric polymer(s) may include one or more fatty acid-modified ionomeric polymers, polystyrene sulfonate, ethylene-methacrylic acid copolymers, and combinations thereof.

In further aspects, the one or more polymers may include one or more styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

In further aspects, the one or more polymers may include one or more polyamide copolymers (e.g., polyamide-polyether copolymers) and/or one or more polyurethanes (e.g., crosslinked polyurethanes and/or thermoplastic polyurethanes). Alternatively, the one or more polymers may include one or more natural and/or synthetic rubbers, such as butadiene and isoprene.

When the resilient polymeric material is a foamed polymeric material, the foamed material may be foamed using a physical blowing agent which phase transitions to a gas based on a change in temperature and/or pressure, or a chemical blowing agent which forms a gas when heated above its activation temperature. For example, the chemical blowing agent may be an azo compound such as adodicarbonamide, sodium bicarbonate, and/or an isocyanate.

In some embodiments, the foamed polymeric material may be a crosslinked foamed material. In these embodiments, a peroxide-based crosslinking agent such as dicumyl peroxide may be used. Furthermore, the foamed polymeric material may include one or more fillers such as pigments, modified or natural clays, modified or unmodified synthetic clays, talc glass fiber, powdered glass, modified or natural silica, calcium carbonate, mica, paper, wood chips, and the like.

The resilient polymeric material may be formed using a molding process. In one example, when the resilient polymeric material is a molded elastomer, the uncured elastomer (e.g., rubber) may be mixed in a Banbury mixer with an optional filler and a curing package such as a sulfur-based or peroxide-based curing package, calendared, formed into shape, placed in a mold, and vulcanized.

In another example, when the resilient polymeric material is a foamed material, the material may be foamed during a molding process, such as an injection molding process. A thermoplastic polymeric material may be melted in the barrel of an injection molding system and combined with a physical or chemical blowing agent and optionally a cross-linking agent, and then injected into a mold under conditions which activate the blowing agent, forming a molded foam.

Optionally, when the resilient polymeric material is a foamed material, the foamed material may be a compression molded foam. Compression molding may be used to alter the physical properties (e.g., density, stiffness and/or durometer) of a foam, or to alter the physical appearance of the foam (e.g., to fuse two or more pieces of foam, to shape the foam, etc.), or both.

The compression molding process desirably starts by forming one or more foam preforms, such as by injection molding and foaming a polymeric material, by forming foamed particles or beads, by cutting foamed sheet stock, and the like. The compression molded foam may then be made by placing the one or more preforms formed of foamed polymeric material(s) in a compression mold, and applying sufficient pressure to the one or more preforms to compress the one or more preforms in a closed mold. Once the mold is closed, sufficient heat and/or pressure is applied to the one or more preforms in the closed mold for a sufficient duration of time to alter the preform(s) by forming a skin on the outer surface of the compression molded foam, fuse individual foam particles to each other, permanently increase the density of the foam(s), or any combination thereof. Following the heating and/or application of pressure, the mold is opened and the molded foam article is removed from the mold.

As discussed in greater detail below, the outsole material 204a is initially provided to a midsole element 202a, 202b in an uncured, fluid state, whereby a profile of the finished outsole 204 is then imparted and cured in a subsequent molding process. The outsole material 204a is selected to impart properties of wear-resistance, durability, and traction. In some examples, the outsole material 204 includes an elastomeric material that has one or more thermoplastic polymers and/or one or more cross-linkable polymers. In an aspect, the elastomeric material can include one or more thermoplastic elastomeric materials, such as one or more thermoplastic polyurethane (TPU) copolymers, one or more ethylene-vinyl alcohol (EVOH) copolymers, and the like.

As used herein, "polyurethane" refers to a copolymer (including oligomers) that contains a urethane group (—N(C=O)O—). These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having (—N(C=O)O—) linkages.

Examples of suitable isocyanates for producing the polyurethane copolymer chains include diisocyanates, such as aromatic diisocyanates, aliphatic diisocyanates, and combinations thereof. Examples of suitable aromatic diisocyanates include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular aspects, the polyurethane polymer chains are produced from diisocynates including HMDI, TDI, MDI, H12 aliphatics, and combinations thereof. In an aspect, the thermoplastic TPU can include polyester-based TPU, polyether-based TPU, polycaprolactone-based TPU, polycarbonate-based TPU, polysiloxane-based TPU, or combinations thereof.

In another aspect, the polymeric layer can be formed of one or more of the following: EVOH copolymers, poly(vinyl chloride), polyvinylidene polymers and copolymers (e.g., polyvinylidene chloride), polyamides (e.g., amorphous polyamides), amide-based copolymers, acrylonitrile polymers (e.g., acrylonitrile-methyl acrylate copolymers), polyethylene terephthalate, polyether imides, polyacrylic imides, and other polymeric materials known to have relatively low gas transmission rates. Blends of these materials as well as with the TPU copolymers described herein and optionally including combinations of polyimides and crystalline polymers, are also suitable.

Figure 2A:
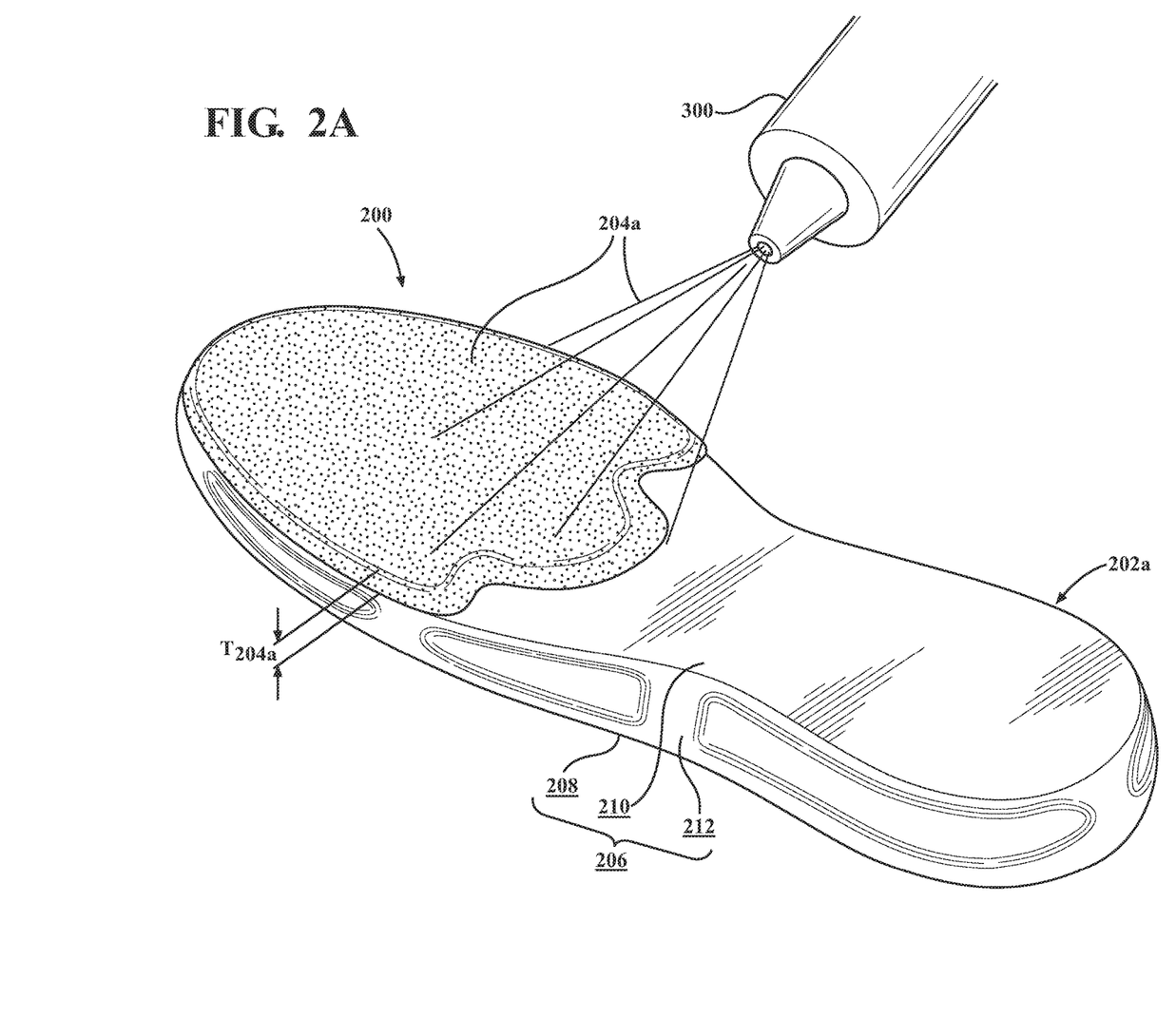
FIG. 2A is a perspective view of one step of a method of producing the sole structure of FIG. 1, showing application of an outsole layer to the sole structure.
Figure 2B:
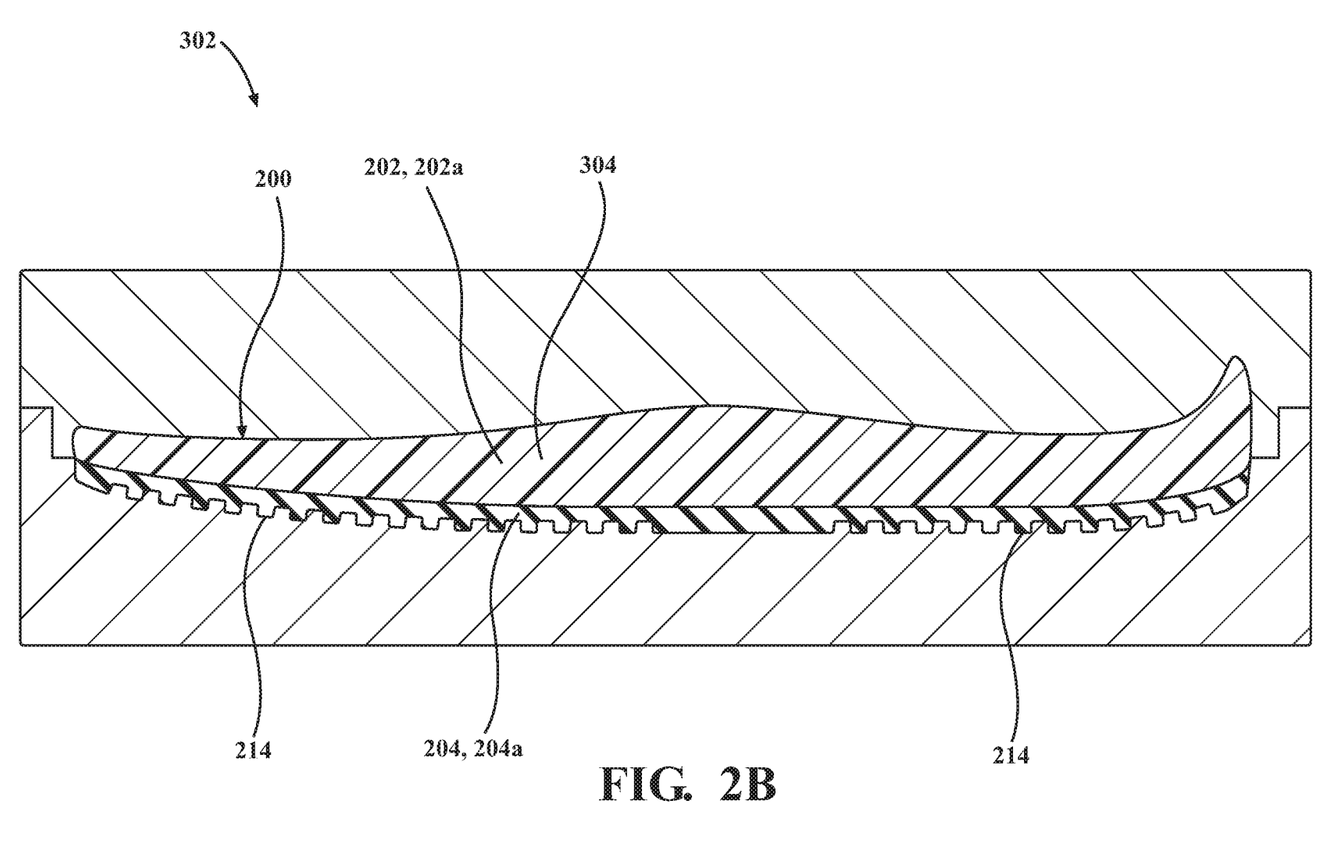
FIG. 2B is a schematic view of another step of the method of producing the sole structure of FIG. 1, showing the sole structure in a molding operation.
Figure 2C:
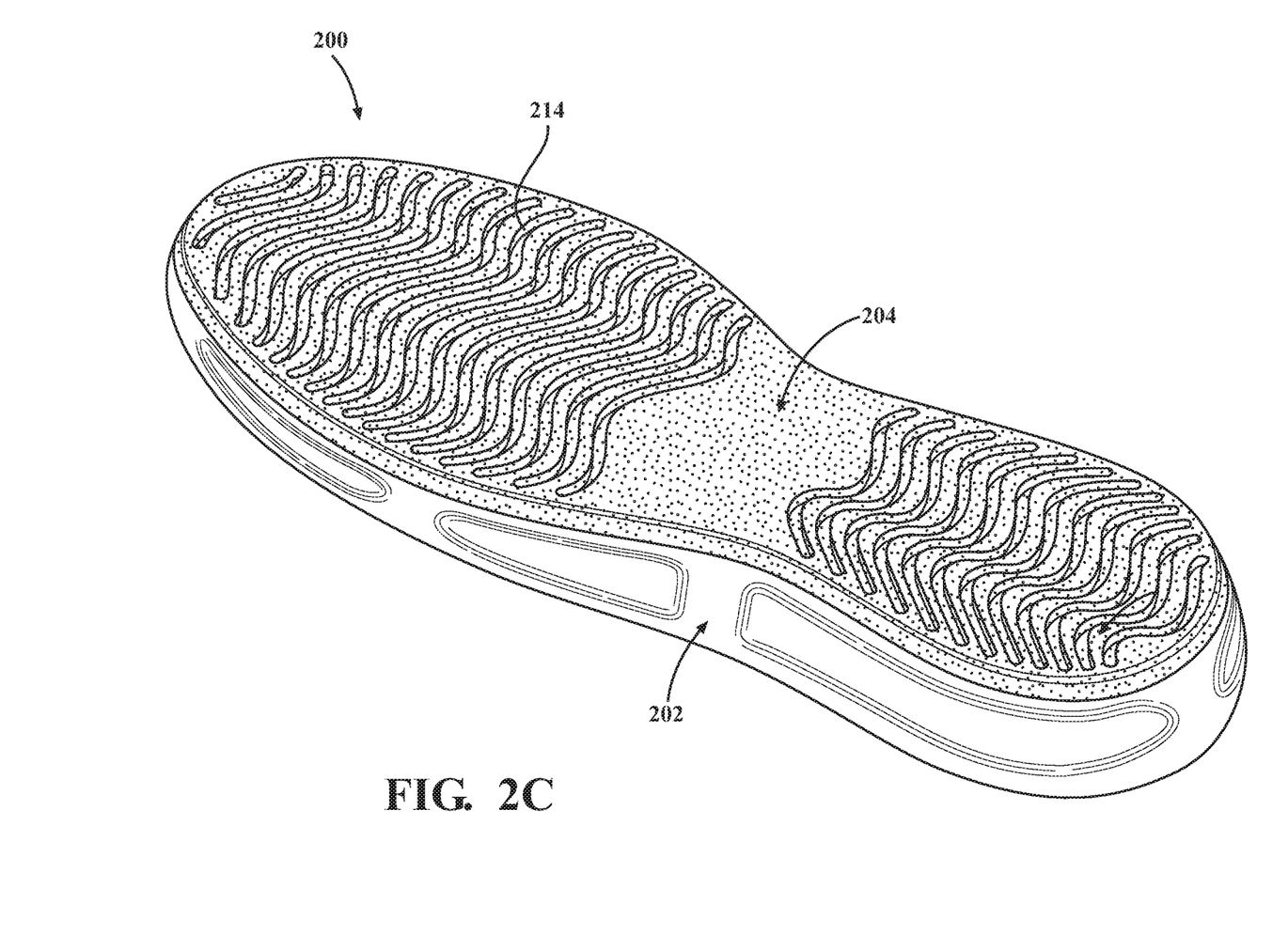
FIG. 2C is a perspective view of another step of a method of producing the sole structure of FIG. 1, showing the sole structure in a molded state.

With reference to FIGS. 2A-2C, one example of a method of forming the sole structure 200 is illustrated. In this example, the midsole element 202a is provided in a substantially final form, where the overall shape and profile of the exterior surface 206 of the final midsole 202 are imparted in a previously completed molding process, and the material of the midsole element 202a is fully-cured. Accordingly, the surfaces 208, 210, 212 of the midsole element 202a are the same as the surfaces 208, 210, 212 of the molded midsole 202 described above. Because the midsole element 202a is in a substantially final form, the outsole 204 can be molded using a cold press method, as discussed below.

FIG. 2A illustrates an initial step of the method, where the uncured outsole material 204a is deposited on the exterior surface 206 of the midsole element 202a. In this example, the midsole element 202a is formed of a polymeric foamed material that has been previously cured, such that the exterior surface 206 of the midsole element 202a is in a substantially final form. For several reasons, applying the outsole material 204a to a fully-formed midsole element 202a is particularly suitable for midsoles formed of injection-molded foams. For example, injection-molded foams are formed by injecting a molten polymeric material into an enclosed mold cavity, which makes it impractical to apply the outsole material 204a to the midsole element 202a prior to molding. Additionally, injection-molded foams often experience post-curing expansion after being released from the pressure of the mold. Because the cured outsole material 204a is unlikely to expand at the same rate as the cured material of the midsole 202, applying the outsole material 204a prior to curing the midsole 202 may result in constriction of the midsole 202 and/or separation of the outsole 204.

Referring still to FIG. 2A, the outsole material 204a is initially applied to the exterior surface 206 of the midsole element 202a in an uncured, fluid state. An applied thickness $T_{204a}$ of the outsole material 204a on the exterior surface 206 of the midsole element 202a is selected to accommodate for manufacturing processes (e.g., molding) and performance characteristics (e.g., traction, abrasion resistance, cushioning, durability). For example, the outsole material 204a may be applied with a greater thickness $T_{204a}$ in regions where the molded outsole 204 will have a greater thickness, or where lugs or traction elements of the outsole 204 may be formed.

In the illustrated example, the outsole material 204a is applied to the midsole element 202a using a deposition process, wherein the outsole material 204a is deposited upon the exterior surface 206 of the midsole element 202a by an applicator 300. Accordingly, the thickness $T_{204a}$ of the outsole material 204a may be controlled by adjusting operating parameters of the applicator 300, such as a deposition rate, a number of passes, droplet size, and/or an application temperature, for example.

Although the illustrated example shows a single outsole material 204a being deposited upon the bottom surface 210 of the midsole element 202a, in some examples the outsole material 204a may be deposited upon the peripheral side surface 212. Additionally or alternatively, a plurality of outsole materials 204a may be deposited in different regions of the exterior surface 206 to provide the sole structure 200 with desired properties. For example, an outsole material 204a having greater abrasion resistance may be deposited in regions of the sole structure 200 associated with increased ground contact frequencies or forces, while outsole materials 204a having greater flexibility may be applied in the mid-foot region 14 of the sole structure 200.

The illustrated example shows a spray deposition process for application of the outsole material 204a. However, the outsole material 204a may be applied to the exterior surface 206 of the midsole element 202a using other methods. For example, the outsole material 204a may be applied by dipping a portion of the midsole element 202a into the outsole material 204a, or by using a contact applicator, such as a brush or roller. In some examples, the exterior surface 206 of the midsole element 202a may be masked prior to deposition of the outsole material 204a to form a desired profile of the outsole 204. One example of masking is described in greater detail below with respect to the spray application process shown in FIG. 4. However, masking may also be used in conjunction with dipping and/or contact applicator processes.

Once the outsole material 204a is applied to the exterior surface 206 of the midsole element 202a, the sole structure 200 is provided to a mold 302 to impart a profile of the finished outsole 204. However, prior to being molded, the outsole material 204a may be allowed to partially cure on the exterior surface 206 of the midsole element 202a, thereby increasing the viscosity of the outsole material 204a to aid in handling of the sole structure 200 between the deposition step (FIG. 2A) and the molding step (FIG. 2B). Particularly, the outsole material 204a may be partially cured until the outsole material 204a is still wet to the touch, but cannot flow along the exterior surface 206 of the midsole element 202a under the force of gravity.

After the outsole material 204a has sufficiently cured, the sole structure 200 is placed within a mold cavity 304 of the mold 302 and subjected to a molding process to impart the profile of the outsole 204. In methods where the outsole material 204a is applied to midsole elements 202a that are in substantially final form, as shown here, the molding process can be accomplished as a cold pressing method where the sole structure 200 is molded and cured at ambient temperatures. As illustrated by FIGS. 2B and 2C, the mold cavity 304 may include various mold features for imparting a tread pattern 214 to the outsole material 204a.

With the outsole material 204a cured, and the outsole 204 fully formed on the exterior surface 206 of the molded midsole 202, the sole structure 200 can be removed from the mold 302 and attached to the upper 100 to form the article of footwear 10. Because the outsole material 204a is cured using a cold pressing process and the structure of the midsole 202 is substantially unchanged from that of the midsole element 202a, the cold pressing process shown in FIGS. 2A-2C may provide the outsole 204 with a pronounced profile relative to the exterior surface 206 of the midsole 202. For example, the outsole 204 will appear as a raised layer on the exterior surface 206 of the midsole 202, resulting in a distinct parting line between the outsole 204 and the midsole 202.

Figure 3A:
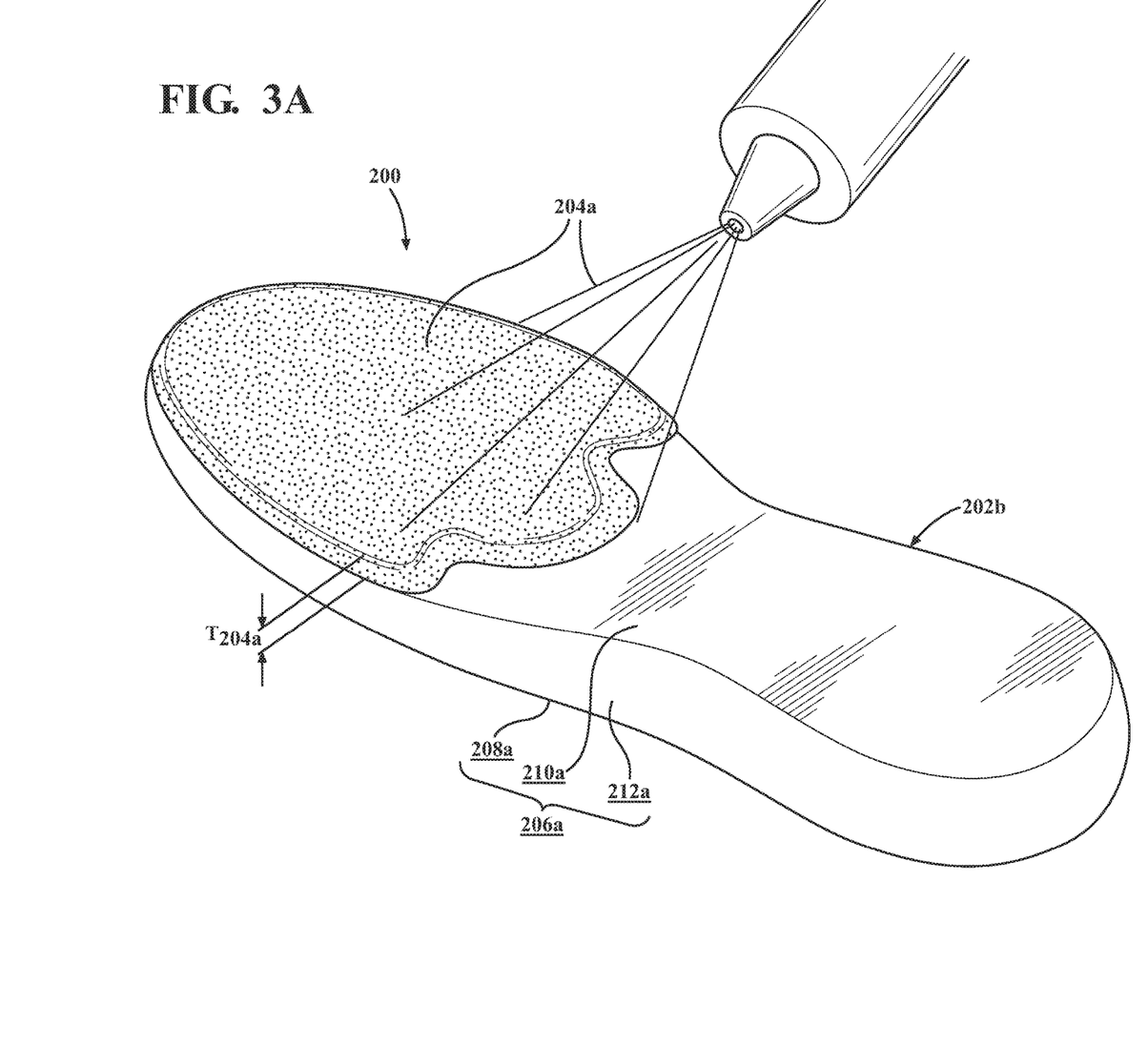
FIG. 3A is a perspective view of one step of another method of producing the sole structure of FIG. 1, showing application of an outsole layer to the sole structure.
Figure 3B:
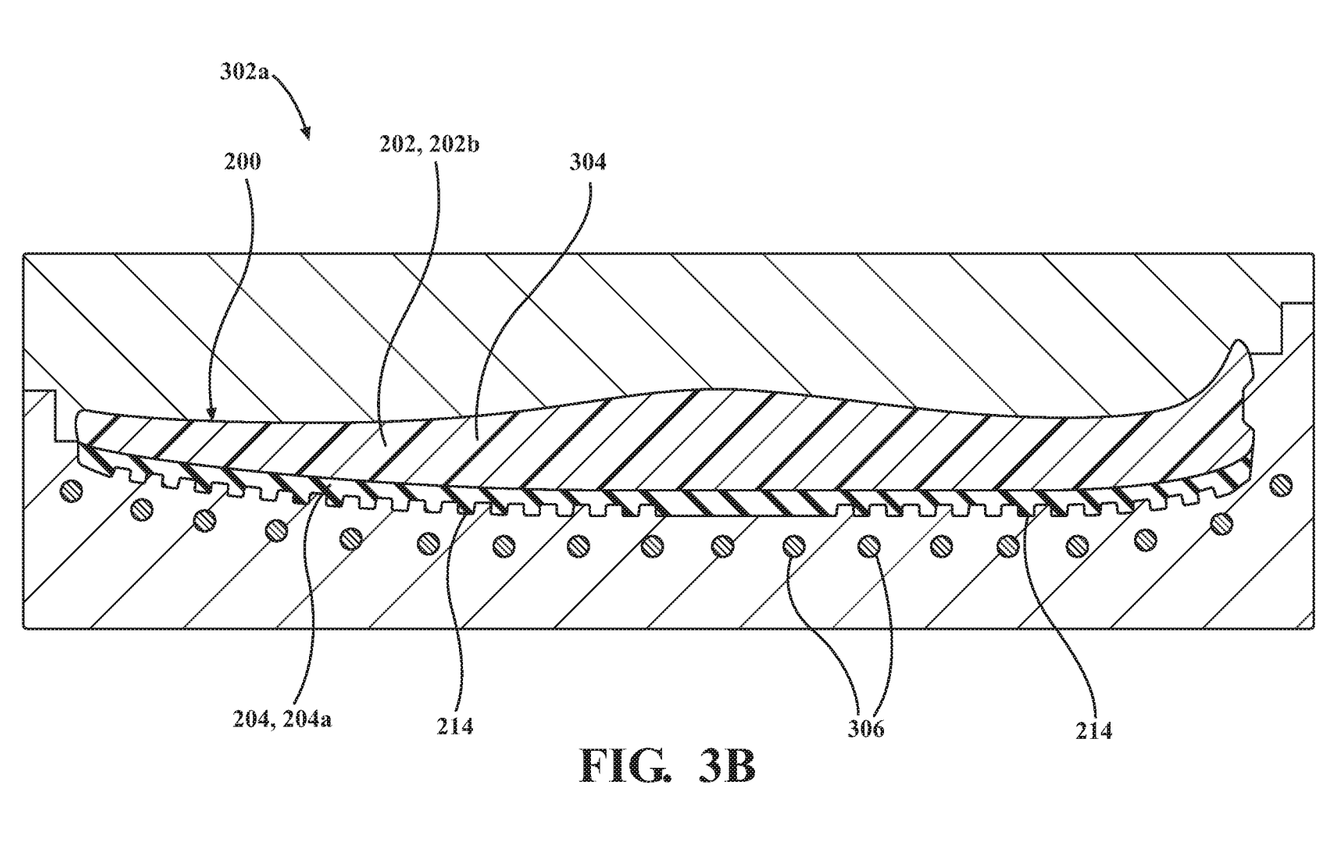
FIG. 3B is a schematic view of another step of the method of producing the sole structure of FIG. 1, showing the sole structure in a molding operation.
Figure 3C:
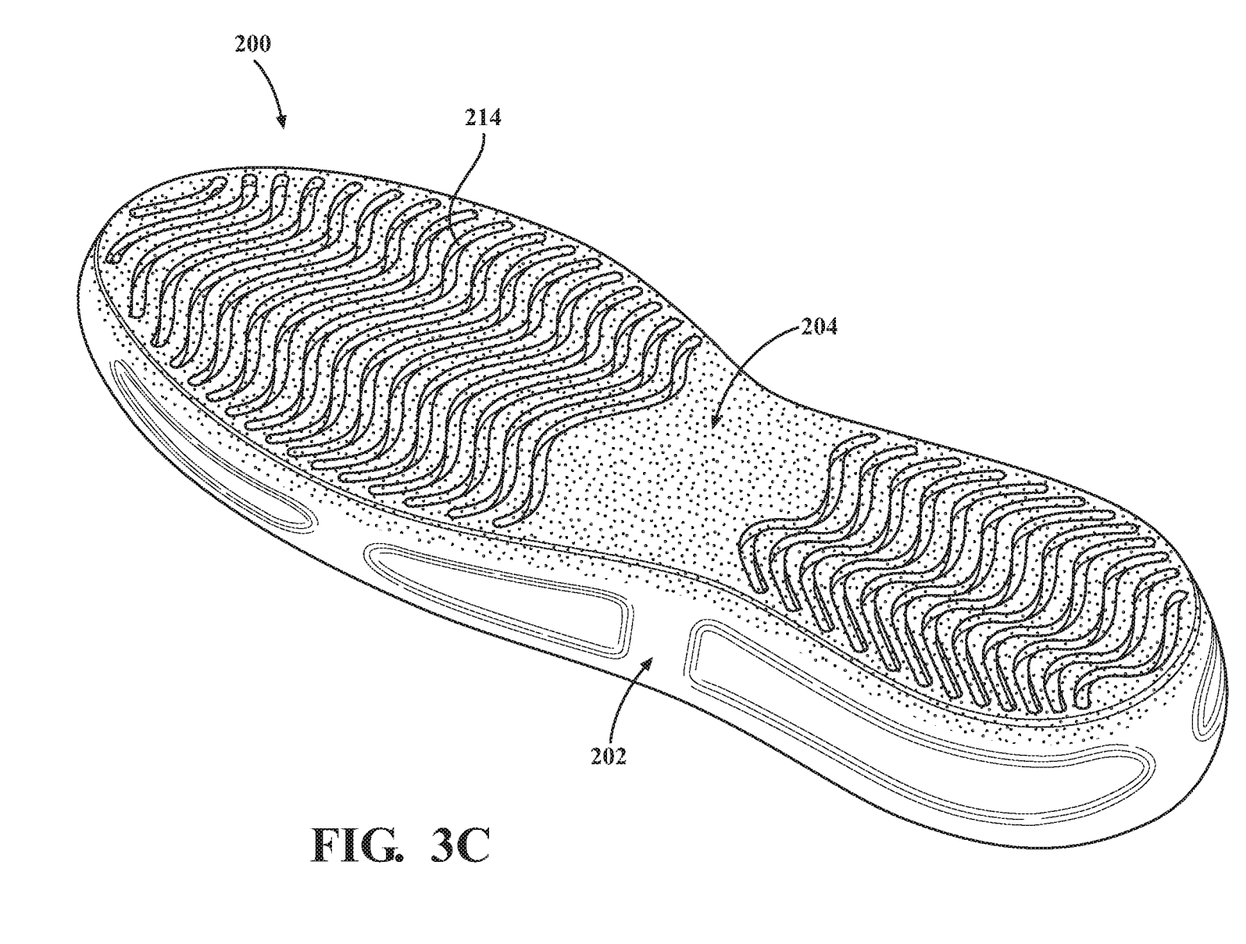
FIG. 3C is a perspective view of another step of a method of producing the sole structure of FIG. 1, showing the sole structure in a molded state.

Referring now to FIGS. 3A-3C, another method for forming the sole structure 200 according to the present disclosure is shown. Unlike the method described with respect to FIGS. 2A-2C, where the midsole element 202a is substantially formed prior to application of the outsole material 204a, the method shown in FIG. 3A involves applying the uncured outsole material 204a to a midsole preform 202b and then simultaneously forming the midsole 202 and the outsole 204 in a heated compression molding process. An example of using a preform 202b in conjunction with a compression molding process is described in greater detail above.

In this example, the midsole element 202b is a midsole preform 202b having a greater size (i.e., volume) than the final midsole 202. Using a midsole preform 202b is particularly suitable for midsoles 202 formed of foamed polymeric materials that are not subject to significant expansion after molding (e.g., compression molded foams), as the midsole 202 and the outsole 204 can be simultaneously molded without concerns of post-molding expansion of the midsole 202, as discussed above with respect to the method of FIGS. 2A-2C.

The midsole preform 202b includes an exterior surface 206a including a top surface 208a and a bottom surface 210a formed on an opposite side of the midsole preform 202b from the top surface 208a. A peripheral side surface 212a extends from the top surface 208a to the bottom surface 210a and forms an outer peripheral profile of the midsole preform 202b. The surfaces 208a, 210a, 212a of the midsole preform 202b correspond to the molded surfaces 208, 210, 212 of the midsole 202.

FIG. 3A illustrates an initial step of the method, where the uncured outsole material 204a is applied to the exterior surface 206a of the midsole preform 202b in an uncured and fluid state. An applied thickness $T_{204a}$ of the outsole material 204a on the exterior surface 206 of the midsole 202 is selected to accommodate for manufacturing processes (e.g., molding) and performance characteristics (e.g., traction, abrasion resistance, cushioning, durability). For example, the outsole material 204a may be applied with a greater thickness $T_{204a}$ in regions where the molded outsole 204 will have a greater thickness, or where lugs or traction elements of the outsole 204 may be formed.

In the illustrated example, the outsole material 204a is applied to the midsole preform 202b using a deposition process, wherein the outsole material 204a is deposited upon the exterior surface 206a of the midsole preform 202b by the applicator 300. Accordingly, the thickness $T_{204a}$ of the outsole material 204a may be controlled by adjusting operating parameters of the applicator 300, such as a deposition rate, a number of passes, droplet size, and/or an application temperature, for example.

Although the illustrated example shows a single outsole material 204a being deposited only on the bottom surface 210a of the midsole preform 202b, in some examples the outsole material 204a may be deposited upon the peripheral side surface 212a. Additionally or alternatively, a plurality of outsole materials 204a may be deposited in different regions of the exterior surface 206 to provide the sole structure 200 with desired properties. For example, an outsole material 204a having greater abrasion resistance may be deposited in regions of the sole structure 200 associated with increased ground contact frequencies or forces, while outsole materials 204a having greater flexibility may be applied in the mid-foot region 14 of the sole structure 200.

Once the outsole material 204a is applied to the exterior surface 206a of the midsole preform 202b, the sole structure 200 is provided to a mold 302a to impart a profile of the finished outsole 204. However, prior to being molded, the outsole material 204a may be allowed to partially cure on the exterior surface 206a of the midsole preform 202b, thereby increasing the viscosity of the outsole material 204a to aid in handling of the sole structure 200 between the deposition step (FIG. 3A) and the molding step (FIG. 3B). Particularly, the outsole material 204a may be partially cured until the outsole material 204a is still wet to the touch, but cannot flow along the exterior surface 206 of the midsole 202 under the force of gravity.

After the outsole material has sufficiently cured, the sole structure 200 is placed within a mold cavity 304 of the mold 302a and subjected to a molding process to impart the profile of the outsole 204. In methods where the outsole material 204a is applied to the midsole preform 202b, the molding process can be accomplished as a heated, compression molding process, where the sole structure 200 is subjected to heat and pressure by the mold 302a to simultaneously impart a profile to each of the midsole 202 and the outsole 204. Thus, as shown in FIG. 3B, the mold 302a may include heating elements 306.

With the outsole material 204a cured, the sole structure 200 can be removed from the mold 302 and attached to the upper 100 to form the article of footwear 10. In contrast to the method of molding the sole structure 200 using a cold pressing process (FIGS. 2A-2C)—where the outsole 204 is formed as a distinct layer upon the exterior surface 206 of the midsole 202—forming the sole structure 200 using the compression molding process (FIGS. 3A-3C) may cause the outsole 204 to be partially impregnated within the exterior surface 206 of the midsole 202 to provide the sole structure 200 with a substantially integral midsole 202 and outsole 204 structure. This effect is provided by allowing the foam material of the midsole 202 to soften under the effect of heat and pressure, thereby allowing outsole material 204a to be absorbed with the material of the midsole 202.

As discussed above, in either of the methods for forming the sole structure 200, the material of the outsole 204 may be applied using various processes, such as a spray deposition process, a dipping process, or a direct application processes, for example. To provide unique outsole profiles, or to prevent the outsole 204 from being applied in particular areas of the sole structure 200, one or more masks 400 may be used during application of the outsole material 204a. As shown, in FIG. 4, in some examples where spray deposition is used, the mask 400 may be provided as floating mask 400 having a mask plate 402 and a plurality of spacers 404 configured to separate the mask plate 402 from the exterior surface of the midsole 202 or midsole preform 208 by a desired distance. The mask plate 402 includes a plurality of apertures 406 corresponding to a desired profile of the outsole 204.

Figure 4:
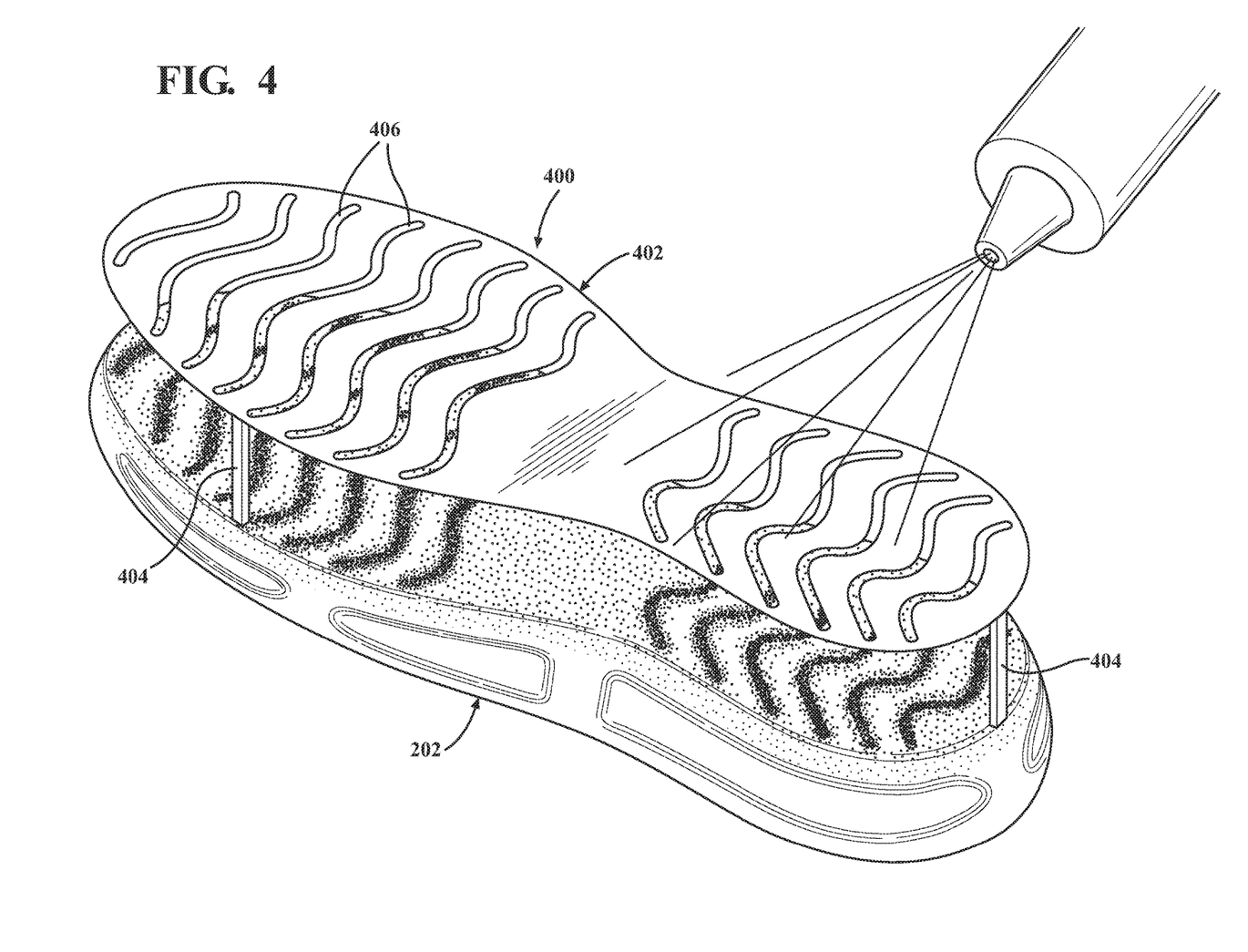
FIG. 4 is a perspective view of another method of applying an outsole layer to a sole structure according to the principles of the present disclosure.

Using a floating mask 400 provides several advantages over conventional surface masks. From a processing standpoint, the floating mask 400 beneficially allows the midsole to be masked while providing only minimal contact points with the midsole 202. This is particularly helpful in instances where the midsole 202 or midsole preform 202b is provided to the outsole material application step in a partially cured or tacky state, where the exterior surface 206 of the midsole 202 or midsole preform 202b may stick to the mask 400.

Additionally, use of the floating mask 400 allows the outsole material 204a to be applied with a faded or gradient structure. For example, as the outsole material 204a passes through the apertures 406 of the mask plate 402, droplets of the outsole material 204a may disperse from the edges of the apertures 406 to provide a dusting effect along the edges of the outsole 204. Particularly, droplet application density may decrease in a direction outwardly from a perimeter of each aperture 406.

Figure 5:
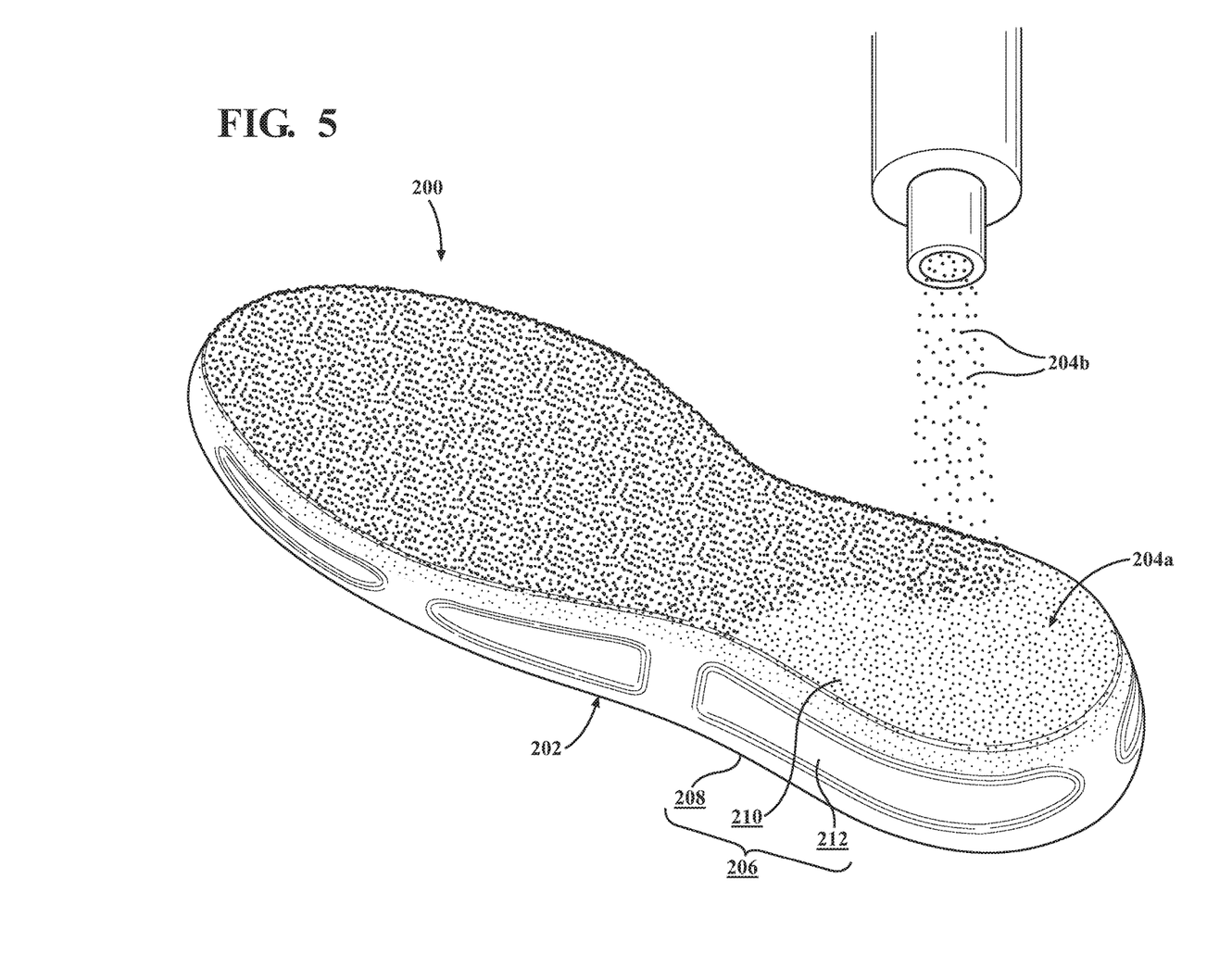
FIG. 5 is a perspective view of another method of applying an outsole layer to a sole structure according to the principles of the present disclosure.

Referring now to FIG. 5, in some examples of the disclosure, the outsole material 204a may include a particulate additive 210 to provide a granular texture to the outsole 204. In some examples, the particulate additive 210 may include reground and recycled polymeric materials. Here, the particulate additive 210 may be mixed with the outsole material 204a prior to application to the midsole elements 202a, 202b. However, in other examples, the outsole material 204a may be applied to the exterior surface 206 of the midsole elements 202a, 202b, and the particulate additive 210 may be deposited onto the uncured outsole material to provide a textured surface. Examples of the particulate additive 210 may include reground polymeric material recovered during production of the sole structure 200. For example, the particulate additive 210 may include excess cured outsole material 204a that is reground and distributed onto the uncured outsole material 204a.

The following Clauses provide an exemplary configuration for an article of footwear described above.

Clause 1: A method of forming a sole structure for an article of footwear, the method comprising providing a midsole element formed of a first polymeric material; depositing an outsole material including an uncured second polymeric material upon an exterior surface of the midsole element; molding the midsole element and the outsole material to impart an outsole profile to the outsole material; and curing the outsole material on the exterior surface of the midsole element.

Clause 2: The method of Clause 1, wherein the first polymeric material is a foamed material.

Clause 3: The method of Clause 1, wherein the second polymeric material is a polyurethane.

Clause 4: The method of Clause 3, wherein the second polymeric material is polyurea.

Clause 5: The method of Clause 1, wherein the midsole element is a finished midsole.

Clause 6: The method of Clause 5, wherein the molding step includes a cold pressing process.

Clause 7: The method of Clause 1, wherein the midsole element is a midsole preform.

Clause 8: The method of Clause 7, wherein the molding step includes a compression molding process.

Clause 9: The method of Clause 1, further comprising partially curing the second polymeric material prior to molding the midsole element and the outsole material.

Clause 10: The method of Clause 1, wherein the outsole material includes a particulate additive.

Clause 11: The method of Clause 1, further comprising masking the exterior surface of the midsole element.

Clause 12: A method of forming a sole structure for an article of footwear, the method comprising providing a midsole element formed of a foamed polymeric material; depositing an outsole material including an uncured polyurethane material upon an exterior surface of the midsole element; molding the midsole element and the outsole material to impart an outsole profile to the outsole material; and curing the outsole material on the exterior surface of the midsole element.

Clause 13: The method of Clause 12, wherein the uncured polyurethane material is polyurea.

Clause 14: The method of Clause 12, wherein the midsole element is a finished midsole.

Clause 15: The method of Clause 14, wherein the molding step includes a cold pressing process.

Clause 16: The method of Clause 12, wherein the midsole element is a midsole preform.

Clause 17: The method of Clause 16, wherein the molding step includes a compression molding process.

Clause 18: The method of Clause 12, further comprising partially curing the polyurethane material prior to molding the midsole element and the outsole material.

Clause 19: The method of Clause 12, wherein the outsole material includes a particulate additive.

Clause 20: The method of Clause 12, further comprising masking the exterior surface of the midsole element.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The invention claimed is:

1. A method of forming a sole structure for an article of footwear, the method comprising:
   providing a mold;
   providing a midsole element formed of a first polymeric material;
   depositing an outsole material including an uncured second polymeric material upon an exterior surface of the midsole element to form a coated midsole element;
   placing the coated midsole element within the mold;
   molding the coated midsole element to impart an outsole profile to the outsole material; and
   curing the outsole material on the exterior surface of the midsole element.

2. The method of claim 1, wherein the first polymeric material is a foamed material.

3. The method of claim 1, wherein the second polymeric material is a polyurethane.

4. The method of claim 3, wherein the second polymeric material is polyurea.

5. The method of claim 1, wherein the midsole element is a finished midsole.

6. The method of claim 5, wherein the molding step includes a cold pressing process.

7. The method of claim 1, wherein the midsole element is a midsole preform.

8. The method of claim 7, wherein the molding step includes a compression molding process.

9. The method of claim 1, further comprising partially curing the second polymeric material prior to molding the coated midsole element and the outsole material.

10. The method of claim 1, wherein the outsole material includes a particulate additive.

11. The method of claim 1, further comprising masking the exterior surface of the midsole element.

12. A method of forming a sole structure for an article of footwear, the method comprising:
    providing a mold;
    providing a midsole element formed of a foamed polymeric material;
    depositing an outsole material including an uncured polyurethane material upon an exterior surface of the midsole element to form a coated midsole element;
    placing the coated midsole element within the mold;
    molding the coated midsole element and the outsole material to impart an outsole profile to the outsole material; and
    curing the outsole material on the exterior surface of the midsole element.

13. The method of claim 12, wherein the uncured polyurethane material is polyurea.

14. The method of claim 12, wherein the midsole element is a finished midsole.

15. The method of claim 14, wherein the molding step includes a cold pressing process.

16. The method of claim 12, wherein the midsole element is a midsole preform.

17. The method of claim 16, wherein the molding step includes a compression molding process.

18. The method of claim 12, further comprising partially curing the polyurethane material prior to molding the coated midsole element and the outsole material.

19. The method of claim 12, wherein the outsole material includes a particulate additive.

20. The method of claim 12, further comprising masking the exterior surface of the midsole element.

* * * * *